United States Patent [19]
Mittnight

[11] Patent Number: 5,606,908
[45] Date of Patent: Mar. 4, 1997

[54] CUTTING BOARD WITH FAN

[76] Inventor: Thomas J. Mittnight, 12 A Atlantic Oaks Cir., St. Augustine, Fla. 32084

[21] Appl. No.: 331,194

[22] Filed: Oct. 28, 1994

[51] Int. Cl.⁶ .......................... A47J 47/00; E04H 15/02; E04H 15/36
[52] U.S. Cl. .............. 99/467; 99/485; 99/646 R
[58] Field of Search .......... 99/467, 485, 646 R; 269/289 R, 302.1

[56] References Cited

U.S. PATENT DOCUMENTS

| | | | |
|---|---|---|---|
| 4,411,254 | 10/1983 | Field et al. | 126/300 |
| 5,311,813 | 5/1994 | Fairbanks et al. | 99/467 |

FOREIGN PATENT DOCUMENTS

| | | | |
|---|---|---|---|
| 0180535 | 7/1990 | Japan | 269/289 R |

*Primary Examiner*—David Scherbel
*Assistant Examiner*—Reginald L. Alexander
*Attorney, Agent, or Firm*—John P. Halvonik

[57] ABSTRACT

An improved cutting board having a fan, or other means for directing air, in connection with the board. The fan may be mounted in a housing that pivots upward so that the housing and the fan are at an angle of, approximately, 115 degrees to the cutting surface of the board. The edges of the board may be raised in order to keep onions or other materials from falling off of the board.

2 Claims, 1 Drawing Sheet

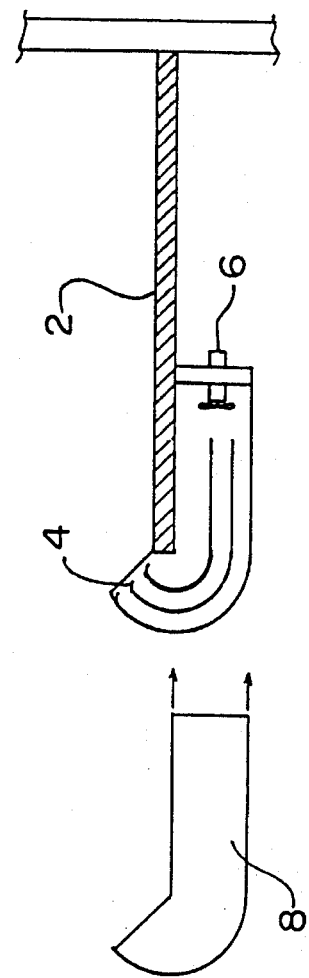
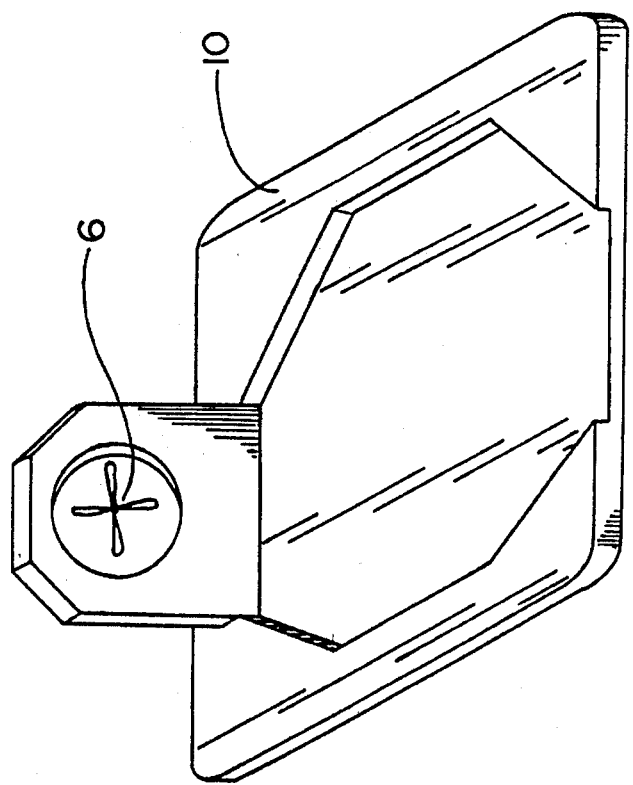

CUTTING BOARD WITH FAN

BACKGROUND AND FIELD OF THE INVENTION

The invention relates to the field of cutting boards and, in particular, to a board having a fan or other means for propelling air in connection with the board.

It is well known that cutting onions frequently results in a tearing of the eyes when one is cutting onions. Often this is referred to as crying. It is thought that the reason for this is that the skin of the onion releases pungent chemicals when the onion skin is cut into. Apparently, these chemicals are released into the air and cause irritation of the eyes which are sensitive to these chemicals.

It is believed that by providing a cutting board with a fan in close connection will prevent the user from suffering the above-mentioned watering of the eyes It is thought that the fan will carry away the irritating chemicals. It should be understood that the invention maybe used as a cutting board for a wide variety of vegetables and not merely onions.

DESCRIPTION OF THE PRIOR ART

Cutting boards for use in chopping vegetables have been known to exist for some time. Others have proposed using flowing water in connection with the board in order to prevent the eyes from tearing as in U.S. Pat. No. 4,765,603 to Huppert. However, there is no known prior art that applicant is aware of that uses a fan in connection with a cutting board. Nor is applicant aware of any other boards that have fans or other means for diverting air in connection therewith.

SUMMARY OF THE INVENTION

The invention is a cutting board having a fan in connection thereto. A housing structure is located at one end of the board and such housing may be joined by a hinge or other means to the board so that the housing can pivot at right angles to the board. An aperture in the housing supports the fan and by pivoting the structure, the fan may be brought at right angles to the board and be in a position from which to carry away the pungent materials from the surface of the board. The edges of the board may be raised in order to prevent the onions or other vegetables from falling off of the board.

It is an object of the invention to prevent the tearing and irritation of the eyes when onions are being cut.

Another object of the invention is to provide a cutting board that is equipped with a fan in order to prevent the tearing of the eyes by carrying irritating materials in the onions away from the board.

Another object of the invention is to provide a cutting board with a raised edge in order to prevent onions and other vegetables from falling off of the board when they are being cut on the board.

Another object is to provide a cutting board with housing for a fan that may be pivoted up and down in order to be easily cleaned.

Other objectives of the invention will become apparent to those skilled in the art once the invention has been shown and described.

DESCRIPTION OF THE DRAWINGS

FIG. 1 Side view of the cutting board.
FIG. 2 Optional construction.

DESCRIPTION OF THE PREFERRED EMBODIMENT

One preferred embodiment of the board is as shown in FIG. 1. The cutting surface 2 of the board may be of any known construction and it is thought that plastic or wood would be the preferred materials. It is thought that the preferred size of the board should be about 12" by 18" with a thickness of about 1".

A support housing may be used to hold the fan as seen in FIG. 2. The housing may be made of plastic or other relatively sturdy materials. The housing should be connected to one edge of the board by a pivoting means, such as a hinge, so that the housing structure may pivot and be positioned at an angle to the board. This edge of the board may be referred to as the "upper edge." The housing should have an aperture in which to support the fan. The aperture would likely be of rounded shape so as to accommodate the shape of most fans. It is believed that the housing should be disposed at angle of about 115° to that of the board, see FIG. 2. The housing may be equipped with appropriate means in order to allow the housing to be set at this angle visa vis the board. It is believed that this housing may be built 3–4" high although other sizes are possible without varying from the spirit of the invention.

The outer edges of the housing should be of rounded construction in order to eliminate the chance for injury on what would otherwise be sharp edges. The housing may be connected to a the board with a snap-on type of construction that would allow the housing to be snapped on and off of the board for easy cleaning. The pivoting connection between the housing and the board may be built so that the housing may be snapped or otherwise set at different angles to the board. The housing should be able to pivot up and down for easy cleaning.

It is thought that a fan would be the preferred device for the air directing means in connection with the board. However, other means of propelling air away from the board are possible without violating the spirit of the invention.

The actual cutting surface of the board is shown as 2. The outside edges 10 of the cutting surface may be raised in order to prevent the onions or other vegetables from falling off of the board. That edge of the board that is opposite the fan may be referred to as the lower edge (as opposed to the "upper edge" that the fan housing is connected to) and would not have the raised construction. This flat edge thus allows the onions or other material to be easily pushed off of the board. The raised construction of the board creates a sort of space into which the fan may be folded down into when not in use.

A counter top embodiment is shown in FIG. 1. In this case the fan may be built directly into a counter with the cutting surface above the fan 6 as part of the countertop. Or, both the fan and cutting board may be constructed as a single, portable unit with the fan below. The fan is disposed beneath the cutting surface and an air deflector 4 is at one end of the cutting surface. The air deflector will direct the air flow from the fan upward and/or across the surface of the cutting surface. The degree of such angle can be adjusted to direct the air in an optimal direction as determined by trial and error.

It is believed that the preferred size of this unit would be about 14" by 36" although other sizes can be built without varying from the spirit of the invention. The same considerations of size would go for the first embodiment described above.

The motor that runs the fan may be powered by batteries or by a power cord that may be plugged into a wall. The motor may be housed in the support structure.

I claim:

1. An improved cutting board comprising:

a board having a cutting surface and having an underside opposite said cutting surface, and having a means for directing air in connection with said cutting board, and having a support structure in connection with said board, said support structure pivotally connected to said cutting board, said means for directing air in connection with said support surface so that said means for directing air may be angled in relation to said cutting surface.

2. An improved cutting board comprising:

a board having a cutting surface and having an underside opposite said cutting surface, and having a means for directing air in connection with said cutting board and in a direction parallel to said cutting surface, wherein said means for directing air comprises a curved duct, said duct having an entrance passage in connection with a fan, said fan in connection with said underside, said duct having an exit passage in connection with said cutting surface.

* * * * *